United States Patent
Forgang (10) Patent No.: US 7,639,016 B2
(45) Date of Patent: Dec. 29, 2009

(54) DOWNHOLE MULTI-PHASE FLOW IMAGER

(75) Inventor: Stanislav W. Forgang, Houston, TX (US)

(73) Assignee: Baker Hughes Incorporated, Houstont, TX (US)

( * ) Notice: Subject to any disclaimer, the term of this patent is extended or adjusted under 35 U.S.C. 154(b) by 30 days.

(21) Appl. No.: 12/014,460

(22) Filed: Jan. 15, 2008

(65) Prior Publication Data

US 2008/0183392 A1 Jul. 31, 2008

Related U.S. Application Data

(63) Continuation-in-part of application No. 11/201,251, filed on Aug. 10, 2005.

(51) Int. Cl.
*G01V 3/00* (2006.01)
*G01V 3/08* (2006.01)

(52) U.S. Cl. ............................ 324/358; 324/347

(58) Field of Classification Search ............. 324/358, 324/347
See application file for complete search history.

(56) References Cited

U.S. PATENT DOCUMENTS

| | | | | |
|---|---|---|---|---|
| 2,930,969 A | 3/1960 | Baker | | 324/10 |
| 4,282,486 A | 8/1981 | Culver et al. | | 324/371 |
| 4,463,378 A | 7/1984 | Rambow | | 358/112 |
| 4,468,623 A | 8/1984 | Gianzero et al. | | 324/367 |
| 5,502,686 A | 3/1996 | Dory et al. | | 367/34 |
| 5,638,337 A | 6/1997 | Priest | | 367/27 |
| 5,640,371 A | 6/1997 | Schmidt et al. | | 367/153 |
| 5,736,637 A | 4/1998 | Evans et al. | | 73/152.31 |
| 6,173,793 B1 | 1/2001 | Thompson et al. | | 175/45 |
| 6,247,542 B1 | 6/2001 | Kruspe et al. | | 175/40 |
| 6,272,915 B1 | 8/2001 | Kosteinicek et al. | | |
| 6,348,796 B2 | 2/2002 | Evans et al. | | 324/374 |
| 6,600,321 B2 | 7/2003 | Evans | | 324/369 |
| 6,714,014 B2 | 3/2004 | Evans et al. | | 324/374 |
| 6,769,497 B2 | 8/2004 | Dubinsky et al. | | 175/27 |
| 6,801,032 B2 | 10/2004 | Miyamoto | | 324/324 |
| 2002/0093879 A1 | 7/2002 | Mandal | | 367/27 |
| 2003/0222651 A1 | 12/2003 | Tabanou | | 324/367 |

(Continued)

FOREIGN PATENT DOCUMENTS

CA      685727      5/1960

OTHER PUBLICATIONS

Maxit et al.; *Downhole Instrumentation for the Measurement of Three-Phase Volume Fractions and Phase Velocities in Horizontal Wells*, Proceedings of ETCE/oOMAE2000 Joint Conference: Energy for the New Millennium, Feb. 14-17, 2000, pp. 8, 5 Figs.

(Continued)

*Primary Examiner*—Reena Aurora
(74) *Attorney, Agent, or Firm*—Madan & Sriram, P.C.

(57) ABSTRACT

Dynamic gain setting is provided for a multiphase flow measuring device that measures in-phase and quadrature signals. The average current at a plurality of measure electrodes is determined and subtracted from the individual measure currents to give a measurement with improved dynamic range.

16 Claims, 4 Drawing Sheets

U.S. PATENT DOCUMENTS

| | | | |
|---|---|---|---|
| 2005/0056461 A1 | 3/2005 | Estes et al. | 175/45 |
| 2005/0098350 A1 | 5/2005 | Eppink et al. | 175/26 |
| 2005/0133263 A1 | 6/2005 | Burrows et al. | 175/45 |
| 2005/0134280 A1 | 6/2005 | Bittar et al. | 324/367 |
| 2005/0189143 A1 | 9/2005 | Cole | 175/26 |
| 2005/0194184 A1 | 9/2005 | Gleitman | 175/45 |
| 2005/0194185 A1 | 9/2005 | Gleitman | 175/45 |

OTHER PUBLICATIONS

J.O. Maxit et al.; "Downhole Instrumentation For the Measurement of Three-Phase Volume Fractions and Phase Velocities in Horizontal Wells", Proceedings of ETCE/OMAE2000 Joint Conference: Energy for the New Millennium, Feb. 14-17, 2000, New Orleans, LA, pp. 1-8.

DOWNHOLE MULTI-PHASE FLOW IMAGER

CROSS-REFERENCES TO RELATED APPLICATIONS

This application is a continuation in part of U.S. patent application Ser. No. 11/201,251 filed on Aug. 10, 2005.

BACKGROUND OF THE INVENTION

1. Field of the Invention

The present invention relates to the downhole evaluation of formation fluids produced into a wellbore. More particularly, the present invention relates to a system that simultaneously combines conductivity and dielectric permittivity sensors in a single downhole module for real-time multiphase flow evaluation.

2. Background of the Art

Fluids are produced from a borehole drilled into the formation rock. The fluids are tested to evaluate the presence of hydrocarbons, the flow-rate, and the presence of multiphase fluids created by the combination of water and hydrocarbons. The resulting data provides information regarding the concentration of hydrocarbons in the formation. The data also provides information regarding the composition and location of hydrocarbons and suggests procedures for maximizing the completion and production of hydrocarbon reservoirs.

The composition of formation fluids can be identified by certain electrical characteristics. Hydrocarbon fluids have a low conductivity, while salt water fluids typically found in subsurface formations have a relatively high conductivity. Because of this fundamental difference in conductivity, downhole sensors measure the conductivity of the formation fluids. Relative conductivity is evaluated by measuring the amount of current transmitted through the formation fluid sample between two or more electrodes when a selected voltage is applied to source electrodes.

In addition to conductivity characteristics, hydrocarbon fluids have a different dielectric permittivity than salt water brines. Dielectric permittivity sensors are usually constructed as a capacitor and measure changes in the capacitor's dielectric. However, dielectric permittivity sensors cannot effectively operate in a conductive medium where the conductivity of the formation fluid exceeds 0.0001 S/m. This phenomenon occurs because the displacement currents between the capacitor plates become negligible when compared to galvanic currents in the formation fluid.

Although downhole sensors have been constructed to evaluate the dielectric properties of formation fluids, such sensors do not provide stable and accurate results when the fluids are electrically conductive. Measurement of dielectric permittivity and conductivity is complicated by the physical difficulty in measuring these parameters at low frequencies with the same electrodes. Accordingly, a need exists for an improved downhole sensor that can accurately and efficiently evaluate multiphase formation fluids.

U.S. Pat. No. 5,736,637 to Evans et al. discloses a system for evaluating multiphase flow of a fluid downhole in a borehole. Dielectric permittivity electrodes generate a capacitance output signal through the fluid, and conductivity electrodes generate a conductivity output signal through the fluid. The electrodes are powered with an AC generator operating at the same or different frequencies. The capacitance and conductivity output signals can be alternately generated by operating a controller, and such signals can be combined with a multiplexer engaged with the controller. The signal can be processed downhole or can be transmitted to a receiver positioned at the well surface for processing and interpretation of the multiphase data.

Maxit et al., "Downhole Instrumentation for the Measurement of Three-Phase Volume Fractions and Phase Velocities in Horizontal Wells", discuss a downhole logging instrument that measures three-phase flow in horizontal and highly deviated wells. Signals from a two-dimensional array of capacitive sensors are measured, and subsequent processing determines the volume fraction and velocity of each component of the borehole flow. The design incorporates an array of capacitive sensors that span the wellbore. Since two orthogonal electrical signals are used to excite local fluid elements, it is possible to determine the fluid capacitance or the volume fraction of conductive fluid in the vicinity of each sensor. Holdups (concentrations of the different components of the multiphase fluid) are calculated from these sensor outputs. Velocities are calculated by correlating outputs from adjacent sensors. The device of Maxit does not require the complications of dual frequency measurements faced by the Evans device.

Figure 2A:
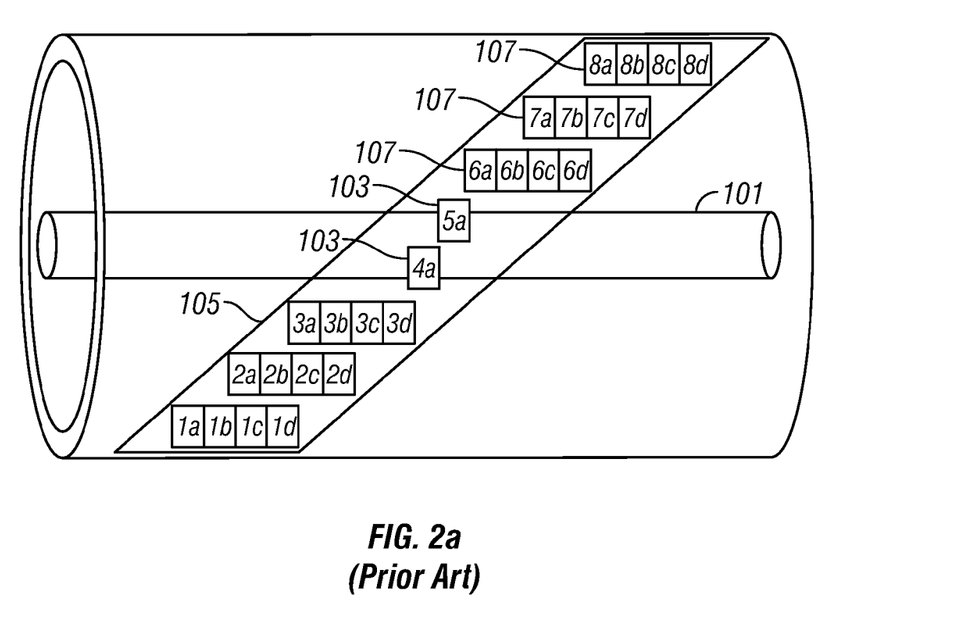
FIG. 2a (prior art) shows a longitudinal cross-section of a prior art MCFM wing sensor deployed in a horizontal; well, FIG. 2b (prior art) projection of the holdup sensor array on a plane normal to the wellbore.
Figure 2B:
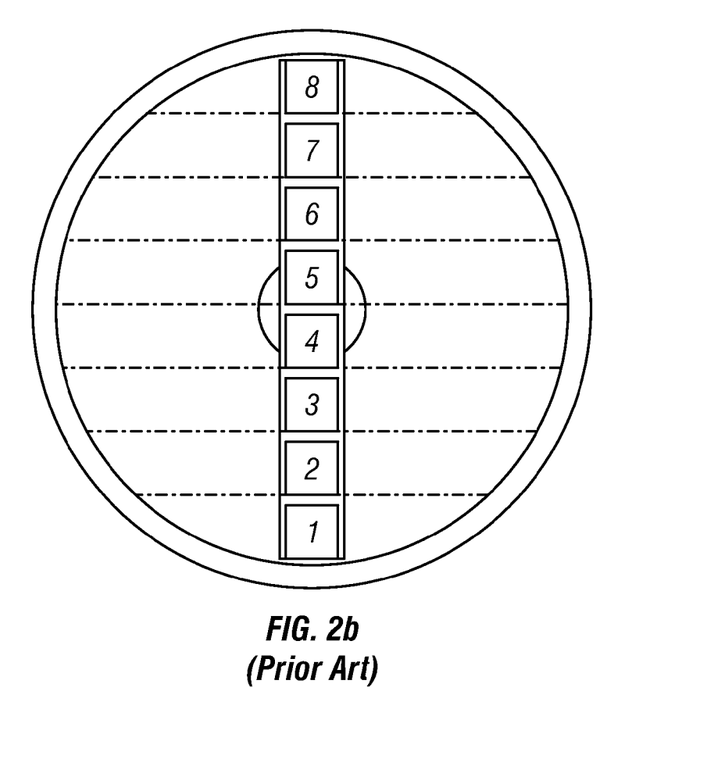

The Multi-Capacitance Flow Meter (MCFM$^{SM}$) of Baker Hughes Incorporated is schematically illustrated in FIGS. 2a, 2b. The tool body is denoted by 101. The tool has a housing and is provided with wings 105. Holdup sensors are denoted by 103. Additionally, arrays of sensor for measuring velocity and holdup are denoted by 107. The tool measures holdups and velocities with alternating current from two transmitter electrodes driven in quadrature: a capacitive electrode and a conductive electrode. The capacitive transmitter electrode consists of an insulated metal plate, while the conductive electrode is in direct contact with the borehole fluid. On the inner side of the wing plate opposite the transmitter electrodes, there is a two-dimensional array of 26 capacitive sensors arranged as shown in FIG. 2a. Eight of these sensors, which span the diameter of the borehole, are used for holdup measurements.

In a horizontal well, the fluid flow profile is expected to be symmetric about a vertical plane that contains the borehole centerline. The MCFM measures velocities at seven levels in this plane, with six arrays of capacitive sensors, as shown in FIG. 2a, and a mechanical spinner in the center.

Figure 3:
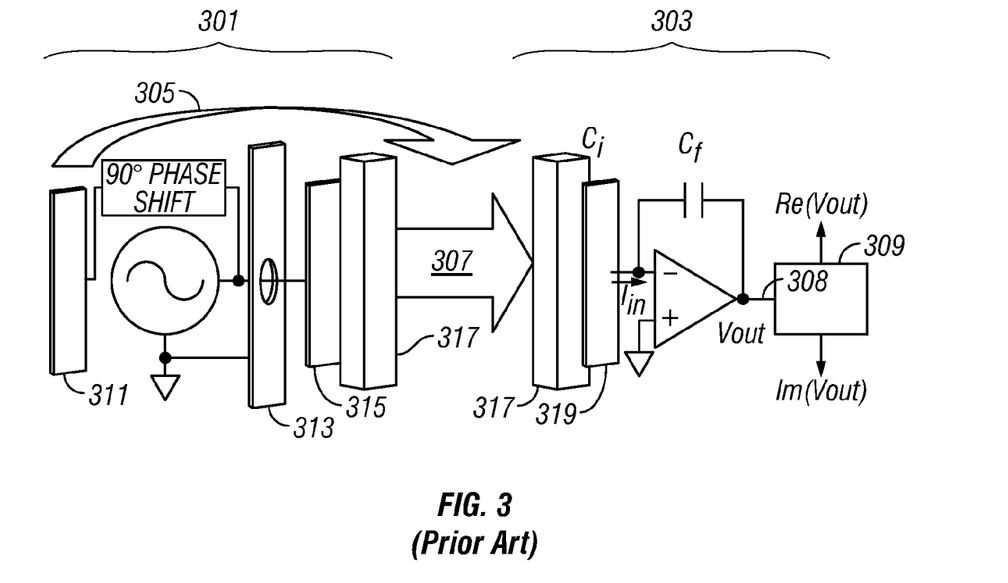
FIG. 3 (prior art) shows the transmitter and sensor configuration to measure galvanic displacement currents with a sensor electrode covered by an insulating film.

The basic concept of the MCFM measurement is shown in FIG. 3. The sensor electrode 319 and the film covering it 317 form the input capacitor $C_i$ of a charge-coupled amplifier 303. The transmitter electrode 301 is driven with a sinusoidal voltage $V_T$ from a generator. The amplifier makes the sensor electrode a virtual ground for the transmitter, so current I flows between the transmitter and sensor electrodes. The galvanic current flow is denoted by 305, the conductance electrode by 311, 313 is a shield, 315 is a capacitance electrode, 307 denotes the displacement current. The capacitive transmitter electrode has a high output impedance while the galvanic transmitter electrode has a low output admittance. Feedback capacitor $C_f$ allows the output voltage of the amplifier $V_{out}$ to be proportional to the input current $I_{in}$. The complex voltages $V_T$ and $V_{out}$ are recorded. The complex fluid admittance Y between the transmitter and sensor electrodes is determined as follows.

$$Y = \frac{I_{in}}{V_T} = \frac{-j(2\pi f C_f V_{out})}{V_T}. \tag{1}$$

The MCFM sensor measures the admittance of a volume of fluid in series with the capacitance of the film covering the electrode. The benefits of this film are threefold: a) enhances the resolution of liquid and gas phase hydrocarbons, b) makes the admittance of water less dependent on conductivity, and c) protects the metal electrodes from chemical interactions with borehole fluids. An important aspect of this is the phase detector 309.

The film covering the electrode also compresses the phase difference between conductive and non-conductive fluids. To distinguish between these fluids, the MCFM incorporates two transmitters driven in quadrature. A signal generator produces a sinusoidal voltage that drives two transmitter electrodes as shown in FIG. 3. The capacitive transmitter electrode 315 is insulated from the fluid, while the conductive transmitter electrode 311 is in galvanic contact with the fluid. The signal applied to the conductive transmitter electrode is shifted 90° relative to the signal on the other electrode. Additionally, the conductive transmitter electrode is shielded from the sensor electrode.

In oil or gas, current from the capacitive transmitter electrode is detected as the imaginary component of $V_{out}$. In this condition, the admittance between the conductive transmitter electrode and the sensor is so small that this current contributes little to $V_{out}$. In water, current from the conductive transmitter electrode is measured as the real component of $V_{out}$, while current from the capacitive transmitter electrode is shunted to ground by the low output impedance of the conductive transmitter. With this method, each holdup sensor produces a complex voltage: the real part is representative of the volume fraction of water, and the imaginary part is indicative of the capacitance.

The electrical admittance of a fluid represents its ability to conduct current in response to an electrical potential. There are two types of current: galvanic current and displacement current. If a fluid conducts galvanic currents, it has conductivity σ. If a fluid conducts displacement currents, it has a permittivity ∈. A volume of fluid has a conductance G proportional to its conductivity σ, and a capacitance C proportional to its permittivity ∈. These proportionality constants are functions of the fluid volume geometry as well as the geometry of the electrodes creating the electrical potential. Therefore, a measurement of current I, resulting from potential V at a frequency f, can be equated to a measurement of the conductivity G and the permittivity ∈ of a volume of fluid by the relation:

$$\frac{I}{V} = G + j(2\pi f C) = \sigma k_1 + j(2\pi f \varepsilon k_2). \qquad (2)$$

The electrical admittance is a complex number, since it must equate the magnitudes and phases of the current and voltage. The geometric factors, $k_1$ and $k_2$, relate the conductivity and capacity of a fluid, respectively, to the conductance and capacitance of a volume of fluid. The MCFM measures both the complex current and voltage between transmitter and sensor electrodes, thereby directly yielding the admittance of the fluid.

Hydrocarbons are non-conductive, while well water is generally conductive. Oil has a dielectric constant more than twice that of gas. Therefore, by measuring the electrical admittance of a volume of fluid, it is possible to identify the fluid. Whenever multiple fluids occupy a volume, the resulting admittance is a function of both the distribution and quantities of the individual fluids. The admittance of such a mixture of fluids will fall in the region bounded by the admittance of the individual fluids. Different models can be used to convert the measured admittance of the fluid into actual component holdups. This topic is well covered in the literature.

At MCFM's frequency of operation, the conductive component of the admittance of water is typically 4 to 6 orders of magnitude larger than the capacitive component, and 5 to 7 orders of magnitude larger than the capacitive component of the admittance of hydrocarbons. In order to compress the dynamic range of this response, each MCFM sensor electrode is covered by an insulating film, which lowers the admittance of these sensors.

A drawback of the prior art device is some complexity resulting from having to insulate the receiver plate and the transmitter plate.

SUMMARY OF THE INVENTION

One embodiment of the disclosure is an apparatus for evaluating multiphase fluid flow in a borehole. The apparatus includes a housing insertable in the borehole at a desired position and having a plurality of sensors. Each of the plurality of sensors includes a transmitter electrode in contact with the fluid and having a low output admittance, a detector electrode in contact with the fluid and having a low input impedance, and a generator engaged with the housing and connected with the transmitter electrode configured to charge the transmitter electrode. The apparatus also includes circuitry which provides a difference between a signal from a detector electrode of one of the plurality of sensors and a combined signal from the detector electrode of a plurality of sensors. This circuitry may be analog circuitry. The apparatus may further include a processor configured to determine from the difference signal an evaluation of the multiphase fluid. The processor may be configured to make the determination based at least in part on a geometric factor of the transmitter electrode with the detector electrode. The processor may be for the configured to produce an image of the multiphase fluid. The processor may be for the configured to estimate a velocity of flow of the multiphase fluid. The detector electrode may be shielded from the transmitter electrode.

Another embodiment of the disclosure is a method of evaluating a multiphase fluid in a borehole. The method includes conveying a housing in the borehole to a desired downhole position, making measurements at a plurality of sensors on the housing a transmitter electrode having a low output admittance on each of the plurality of sensors in contact with the fluid, and a detector electrode on each of the plurality of sensors having a low input impedance in contact with the fluid, providing a difference between a signal from a detector on one of the plurality of sensors and a combined signal from a detector on each of the plurality of sensors, evaluating the multiphase fluid using the difference signal, and recording the evaluation on a suitable medium. Providing the difference signal may be done using analog circuitry. Evaluating the multiphase fluid may be based at least in part on a geometric factor between a transmitter electrode with a detector electrode. The method may further include producing an image of the multiphase fluid. The method may further include estimating a velocity of flow of the multiphase fluid. The method may further include shielding the detector electrode from the transmitter electrode. The method may further include operating a flow controller device based on the evaluation.

Another embodiment of the disclosure is a computer readable medium for use with an apparatus for evaluating multiphase fluid in a borehole. The apparatus includes a housing insertable in the wellbore at a design of a downhole position, and having a plurality of sensors. Each of the plurality of sensors includes a transmitter electrode in contact with the fluid and having a low output admittance, a detector electrode in contact with the fluid and having a low input impedance, and a generator engaged in the housing and connected with the transmitter electrode that is configured to charge the transmitter electrode. The apparatus also includes circuitry which provides a difference between a signal from a detector electrode of one of the plurality of sensors and a combined signal from the detector electrode of a plurality of sensors. The medium may include a ROM, an EPROM, an EAROM, a flash memory, and/or an optical disk.

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
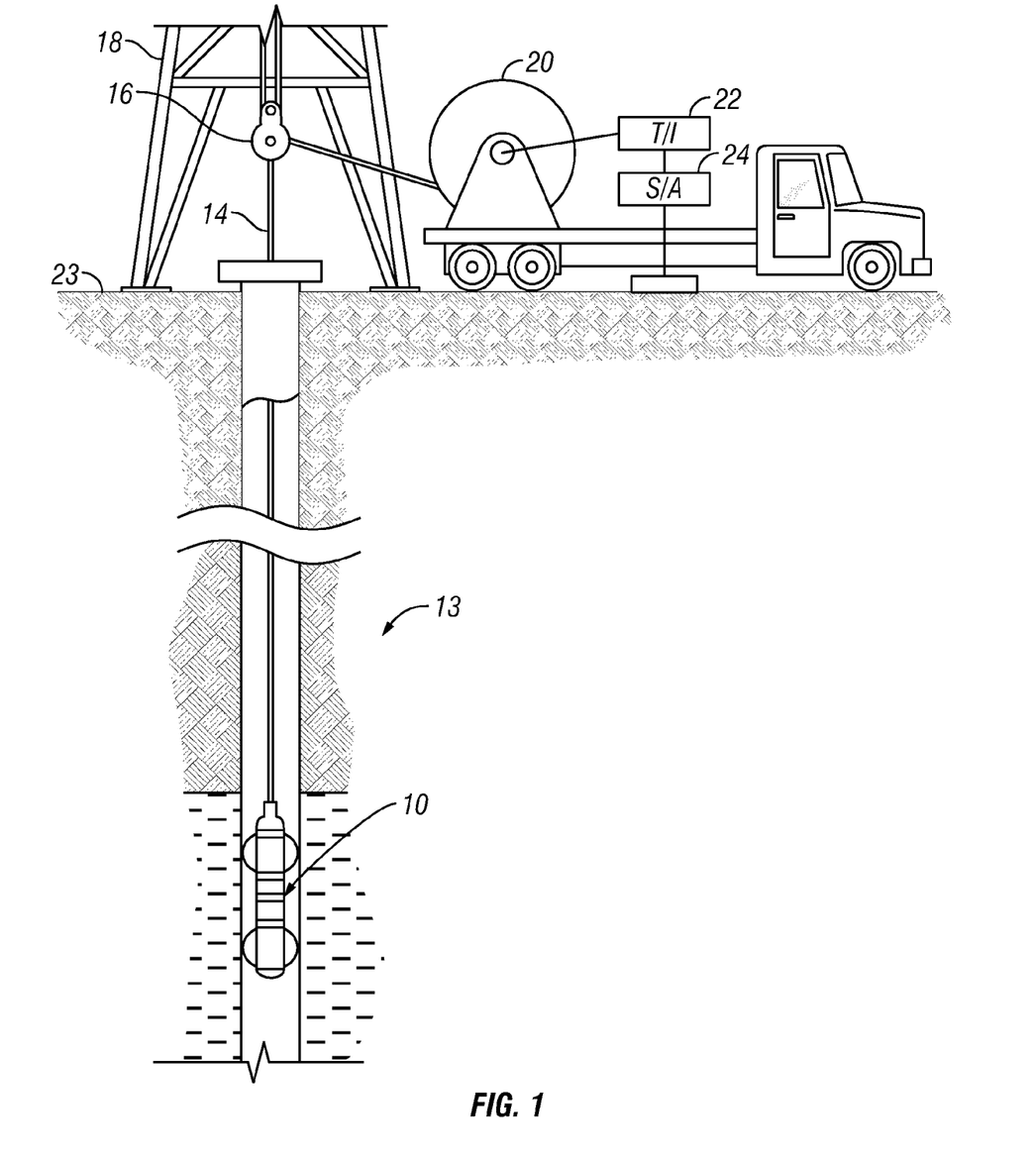
FIG. 1 shows the flow-rate measuring tool of this invention suspended in a borehole.

FIG. 1 shows flow-rate sensor tool 10 suspended in a borehole 12, that penetrates earth formations such as 13, from a suitable cable 14 that passes over a sheave 16 mounted on drilling rig 18. This is for illustrative purposes only, and the flow-rate sensor tool may be permanently deployed in a borehole. The borehole may be vertical, deviated, or horizontal. For deployment in horizontal boreholes, devices such as coiled tubing or tractors may be used. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. Some of the data processing may also be done by a downhole computer.

Figure 4:
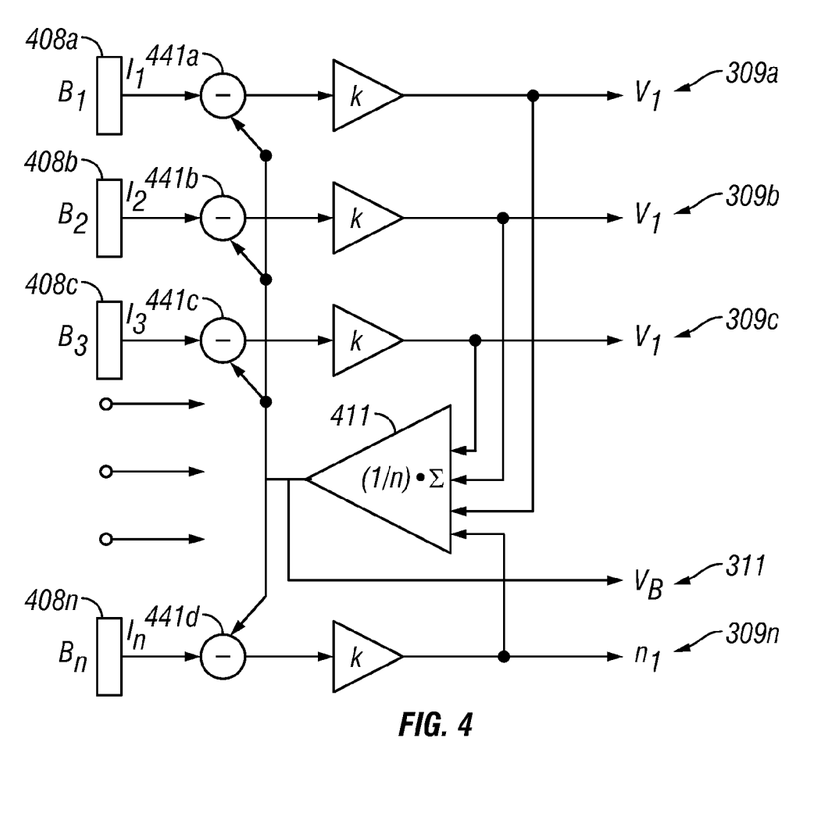
FIG. 4 illustrates additional circuitry added to the circuit of FIG. 3 to address the problem of large dynamic range.

In order to address the problem of dynamic range while a conductive fraction dominates in the downhole fluid, an adaptive feed back is implemented in the front-end part of the wing replacing individual charge-coupled amplifiers, i.e., prior to the phase detector 309. This is illustrated with reference to FIG. 4. 408a, 408b, 408c . . . 408n denoted the sensor output at the point 319 for a plurality of the sensors. The buffered current outputs $V_1, V_2, V_3 \ldots V_n$ of the electrodes are averaged by the averaging amplifier 511 and the output of the averaging amplifier VB is used as a negative feedback to the differential amplifiers 441a, 441b, 441c . . . 441n, the other input to the differential amplifiers being the corresponding measured currents $I_1, I_2, I_3 \ldots I_n$ in the electrodes $B_1, B_2, B_3 \ldots B_n$. Each differential amplifier 441a, 441b, 441c . . . 441n could be build based on the same principles of the charge amplifier as disclosed the above. The feedback signal VB then could be applied to respective inverting input of the amplifiers; however, other modifications are feasible. The output of the averaging amplifier 511 could also be used for further processing, saved for subsequent retrieval, or sent by telemetry uphole as an indication of the gain and averaged signal VB phase setting. The filtered and phased discriminated outputs of the electrodes $V_1, V_2, V_3 \ldots V_n$ provide a high resolution image of the complex downhole fluid flow that has an improved dynamic range over the raw measurements. The phase detectors 309a, 309b, 309c, . . . 309n could be constructed using conventional analog (based, for instance, on the gain/phase analyzer AD8302 from Analog Devices Inc.) or digital approaches. The image is indicative of local heterogeneities of the fluid flow. The average may be added back to the digitized filtered outputs.

Those versed in the art and having benefit of the present disclosure would recognize that the separation of the galvanic and capacitive transmitters was done initially to deal with the large dynamic range. This includes the use of the 90° phase shift. In a non-conductive fluid, current follows through the non-conductive fluid from capacitive transmitter plate that is located in relatively close proximity to receiver plate. The charge coupled amplifier converts this current in the voltage $V_{out}$ that is in-phase with the transmitter one (actually, 180° out of phase). The reason for this is that $C_f$ acts as a feedback and thus making the amplifier just an inverter with respect to the transmitter voltage signal with the gain controlled by fluid capacitance. The amplifier voltage gain would then be $$k = \frac{C_{fluid} + C_i}{C_f}.$$

Figure 5:
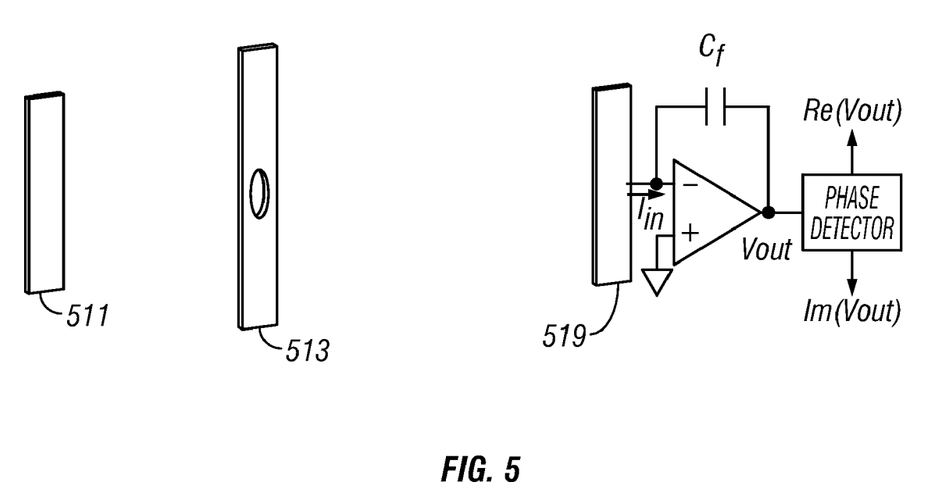
FIG. 5 illustrates the simplified sensor arrangement resulting from use of AGC.

If, on the other hand, water is present, the galvanic signal will appear. The gain for the galvanic case would be limited to $$k = \frac{\frac{1}{2\pi f C_f}}{\left[ R_{fluid} + \frac{1}{2\pi f C_i} \right]}$$

and would never exceed $$k = \frac{C_i}{C_f},$$

preventing the amplifier from saturation. However, phase detection is needed to reveal the effect of $R_f$ from the overall signal. By introducing the adaptive gain control (AGC) the problem with saturation becomes manageable as this may allow for efficient suppressing of the signal dynamic range without the necessity to insulate the receiver plate (no $C_i$) and eliminate galvanic (or capacitive) transmitter plate as unnecessary. That is, with AGC the system could become simpler, i.e., it would look as simple as having non-insulated transmitter plate 511 and non-insulated receiver plate 519 with all its electrodes and current focusing 513 in FIG. 5 remaining as is.

Those versed in the art would recognize that the detector should have a low input impedance.

Those versed in the art and having the benefit of the present disclosure would recognize that the apparatus described above is capable of providing a conductance and permittivity image of the fluid in the proximity of the wing, just as the device from the parent application Ser. No. 11/201,251 can provide a resistivity image of the earth formation. Velocity determination can be done by injecting a slug of fluid into the borehole that has different electrical properties from the fluid. By correlating measurements in each of the arrays 107, the velocity of flow can be determined. In addition, in situations where bubbles of a gaseous phase are present, the velocity of these bubbles may be measured.

When the tool is positioned in a production wellbore, a log of the fluid composition is produced. The housing may be conveyed on a wireline or may be deployed in a production borehole. Based on the estimated fluid composition, downhole flow control devices may be operated to avoid undesirable operating conditions.

The operation of the transmitters and receivers may be done by a downhole processor and/or a surface processor. Implicit in the control and processing of the data is the use of a computer program on a suitable machine readable medium that enables the processor to perform the control and processing. The processing may include, for example, producing a resistivity image of the wall of the borehole using the filtered signals from the measure electrodes. The machine readable medium may include ROMs, EPROMs, EAROMs, Flash Memories and Optical disks. The term "processor" as used herein is intended to include Field Programmable Gate Arrays (FPGAs).

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for evaluating multiphase fluid in a borehole, comprising:
    a housing insertable in the borehole at a desired position;
    a plurality of sensors, each of the plurality of sensors comprising:
        (A) a transmitter electrode in contact with the fluid and having a low output admittance;
        (B) a detector electrode in contact with the fluid and having a low input impedance; and
        (C) a generator engaged with the housing and connected with the transmitter electrode configured to charge the transmitter electrode; and
    circuitry which provides a difference between a signal from a detector electrode of one of the plurality of sensors and a combined signal derived from the detector electrode of a plurality of sensors.

2. The apparatus of claim 1 wherein the circuitry comprises analog circuitry.

3. The apparatus of claim 1 further comprising a processor configured to determine from the difference signal an evaluation of the multiphase fluid.

4. The apparatus of claim 3 wherein the processor is configured to determine the evaluation of the fluid based at least in part on a geometric factor of the transmitter electrode with the detector electrode.

5. The apparatus of claim 1 wherein the processor is further configured to produce on image of the multiphase fluid.

6. The apparatus of claim 1 wherein the processor is further configured to estimate a velocity of flow of the multiphase fluid.

7. The apparatus of claim 1 wherein the detector electrode is shielded from the transmitter electrode.

8. A method of evaluating a multiphase fluid in a borehole, the method comprising:
    conveying a housing in the borehole to a desired downhole position;
    making measurements with a plurality of sensors on the housing using a transmitter electrode having a low output admittance on each of the plurality of sensor in contact with the fluid, and a detector electrode on each of the plurality of sensors having a low input impedance in contact with the fluid;
    providing a difference between a signal from a detector on one of the plurality of sensors and a combined signal derived from a detector on each of the plurality of sensors;
    evaluating the multiphase fluid using the difference signal; and
    recording the evaluation on a suitable medium.

9. The method of claim 8 wherein providing the difference signal further comprises using analog circuitry.

10. The method of claim 9 wherein evaluating the multiphase fluid is based at least in part on a geometric factor of a transmitter electrode with a detector electrode.

11. The method of claim 8 further comprising producing an image of the multiphase fluid.

12. The method of claim 8 further comprising estimating a velocity of flow of the multiphase fluid.

13. The method of claim 8 further comprising shielding the detector electrode from the transmitter electrode.

14. The method of claim 8 further comprising operating a flow control device based on the evaluation.

15. A computer readable medium for use with an apparatus for evaluating a multiphase fluid in a borehole, the apparatus comprising:
    a housing insertable in the wellbore at a desired downhole position;
    a plurality of sensors, each of the plurality of sensors comprising:
        (A) a transmitter electrode in contact with the fluid and having a low output admittance;
        (B) a detector electrode in contact with the fluid and having a low input impedance; and
        (C) a generator engaged with the housing and connected with the transmitter electrode configured to charge the transmitter electrode with an electrical charge; and
    circuitry which provides a difference between a signal from a detector electrode of one of the plurality of sensors and a combined signal derived from the detector electrode of a plurality of sensors,
    the medium comprising instructions that enable a processor to evaluate the fluid using the difference signal.

16. The machine readable medium of claim 15 further comprising at least one of: (i) a ROM, (ii) an EPROM, (iii) an EAROMs, (iv) a flash memory, and (v) an optical disk.

* * * * *

UNITED STATES PATENT AND TRADEMARK OFFICE
CERTIFICATE OF CORRECTION

| | | |
|---|---|---|
| PATENT NO. | : 7,639,016 B2 | Page 1 of 1 |
| APPLICATION NO. | : 12/014460 | |
| DATED | : December 29, 2009 | |
| INVENTOR(S) | : Stanislav W. Forgang | |

It is certified that error appears in the above-identified patent and that said Letters Patent is hereby corrected as shown below:

Column 5, line 64, delete "amplifier 511", insert --amplifier 411--;

Column 6, line 7, delete "amplifier 511", insert --amplifier 411--;

Column 7, claim 1, line 54, delete "electrode of a", insert --electrodes of the--;

Column 8, claim 5, line 2, delete "produce on", insert --produce an--;

Column 8, claim 8, line 14, delete "sensor", insert --sensors--;

Column 8, claim 8, line 15, delete "fluid, and", insert --fluid and--;

Column 8, claim 15, line 41, delete "wellbore", insert --borehole--; and

Column 8, claim 15, line 55, delete "electrode of a", insert --electrodes of the--.

Signed and Sealed this

Sixteenth Day of March, 2010

David J. Kappos
*Director of the United States Patent and Trademark Office*